United States Patent
Benfield et al.

(10) Patent No.: US 7,921,191 B2
(45) Date of Patent: Apr. 5, 2011

(54) SCHEMA MANAGEMENT

(75) Inventors: Bruce A. Benfield, Austin, TX (US);
Daniel T. Chang, San Jose, CA (US);
Mary C. Lehner, San Jose, CA (US);
Sundararaman Saiprasad, San Jose, CA (US); Robbert C. Van der Linden, Scotts Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 12/196,213

(22) Filed: Aug. 21, 2008

(65) Prior Publication Data

US 2008/0313219 A1    Dec. 18, 2008

Related U.S. Application Data

(63) Continuation of application No. 10/763,013, filed on Jan. 21, 2004, now Pat. No. 7,433,940.

(51) Int. Cl.
*G06F 15/177* (2006.01)

(52) U.S. Cl. ......... 709/221; 709/223; 709/226; 709/245

(58) Field of Classification Search .................. 709/221, 709/223, 226, 245
See application file for complete search history.

(56) References Cited

U.S. PATENT DOCUMENTS

| | | | |
|---|---|---|---|
| 7,047,488 B2 * | 5/2006 | Ingersoll et al. | 715/235 |
| 7,433,940 B2 | 10/2008 | Benfield et al. | |
| 2002/0107973 A1 | 8/2002 | Lennon et al. | |
| 2002/0143521 A1 | 10/2002 | Call | |
| 2002/0152267 A1 | 10/2002 | Lennon | |
| 2002/0184401 A1 | 12/2002 | Kadel et al. | |
| 2003/0018607 A1 | 1/2003 | Lennon et al. | |
| 2003/0140308 A1 | 7/2003 | Murthy et al. | |
| 2003/0156108 A1 | 8/2003 | Vetro | |
| 2004/0177039 A1 | 9/2004 | Pincus et al. | |
| 2005/0120029 A1 | 6/2005 | Tomic et al. | |

FOREIGN PATENT DOCUMENTS

| | | |
|---|---|---|
| WO | 0246916 | 6/2002 |
| WO | 03030031 | 4/2003 |

OTHER PUBLICATIONS

Dyck, T., "Tamino Gains Query Power", © 2004 Ziff Davis Media Inc., [online], [Retrieved on Feb. 5, 2004]. Retrieved from the Internet at <URL: http://www.eweek.com/print_article/0,3048,a=38022,00.asp>, 2 pp.

(Continued)

*Primary Examiner* — Larry Donaghue
*Assistant Examiner* — Nicholas Taylor
(74) *Attorney, Agent, or Firm* — Konrad Raynes & Victor LLP; Janaki K. Davda

(57) ABSTRACT

Disclosed is a system and program for managing schemas. A schema and one or more associated schema documents are registered. A schema information document is automatically generated based on the schema and the one or more associated schema documents. A request to be performed on at least one of the schema, an associated schema document, and the schema information document is processed.

14 Claims, 8 Drawing Sheets

OTHER PUBLICATIONS

Raining Data, "Release of TigerLogic XDMS", © 2004 Raining Data, [online], [Retrieved on Feb. 5, 2004]. Retrieved from the Internet at <URL: http://www.rainingdata.com/company/pressroom/tlrelease.html>, 5 pp.

Tracy, S., "Prime Time for XML", [online], Intelligent Enterprise, May 2002, [Retrieved on Feb. 5, 2004]. Retrieved from the Internet at <URL: http://www.intelligentinterprise.com/print_article/flat.jhtml?article=/020528/509warehouse1_1.jhtml>, 5 pp.

* cited by examiner

SCHEMA MANAGEMENT

CROSS-REFERENCE TO RELATED APPLICATIONS

This application is a continuation of and claims the benefit of "SCHEMA MANAGEMENT", having application Ser. No. 10/763,013, filed Jan. 21, 2004, the entire contents of which is incorporated herein by reference.

BACKGROUND OF THE INVENTION

1. Field of the Invention

The present invention is related to schema management.

2. Description of the Related Art

Extensible markup language (XML) may be described as a language specification developed by the World Wide Web Consortium (W3C). XML allows creation of XML documents that provide data and format information. XML documents contain elements and attributes defined by the XML specification. An XML schema is a type of XML document that is used to assess the validity of "well-formed" elements and attributes in other XML documents. Each XML document is associated with at least one XML schema. For more information on schemas, see XML Schema Part 1: Structures. W3C Recommendation 2 May 2001 (http://www.w3.org/TR/xmlschema-1/).

There are many instances in which users and/or components use XML schemas. For example, XML databases, XML-relational databases, and XQuery processors access XML schemas for use in validating XML documents and elements. XQuery is a query language that uses the structure of XML to express queries across data. XML documents are validated to ensure that they are "well-formed" as defined by the XML specification. Additionally, XML databases and XML-relational databases associate with XML schemas for use in constraining XML documents or elements. Constraining refers to identifying whether an XML document fits a constraint. For example, if a folder or a column of a table is created to hold XML documents that are resumes, then a particular schema may be used to determine whether a particular XML document is a resume. Also, schema-specific XML parser generators access and associate with XML schemas for parser generation and usage. Moreover, general purpose XML parsers access XML schemas for use in validating XML documents.

Currently, there may be a large number of XML schemas associated with a larger number of XML documents for a particular system. Typically, a user or component needs to know which particular XML schema is needed for processing (e.g., for validating an XML document). With so many XML schemas and XML documents, it is difficult for users and components to know which XML schema to access for a particular XML document.

An XML namespace is a collection of element type and attribute names that are uniquely identified by the name of the unique XML namespace of which they are a part. For example, in an XML document, any element type or attribute name can have a two-part name consisting of the name of its namespace and then its local name. Also, several schemas may share a namespace. Currently, an XML document may describe an XML namespace of its associated XML schema, but because a namespace may imply multiple XML schemas, the namespace alone may not identify a desired XML schema.

Moreover, an XML document may include a statement that declares a namespace and a Uniform Resource Identifier (URI) that identifies a point of content, but the URI does not necessarily provide the physical location of the XML schema. Therefore, such a statement may not be useful in identifying a specific XML schema. Thus, again, a user or component needs to know which XML schema is required.

An XML schema is a logical entity, and, management of XML schemas requires more than managing XML schema documents associated with the XML schema. Also, because XML schemas are not managed in conventional systems, it is difficult to identify a particular XML schema in conventional systems. Thus, there is a need in the art to improve schema management, for example, for XML schemas.

SUMMARY OF THE INVENTION

Provided are a system and program for managing schemas. A schema and one or more associated schema documents are registered. A schema information document is automatically generated based on the schema and the one or more associated schema documents. A request to be performed on at least one of the schema, an associated schema document, and the schema information document is processed.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Figure 1A:
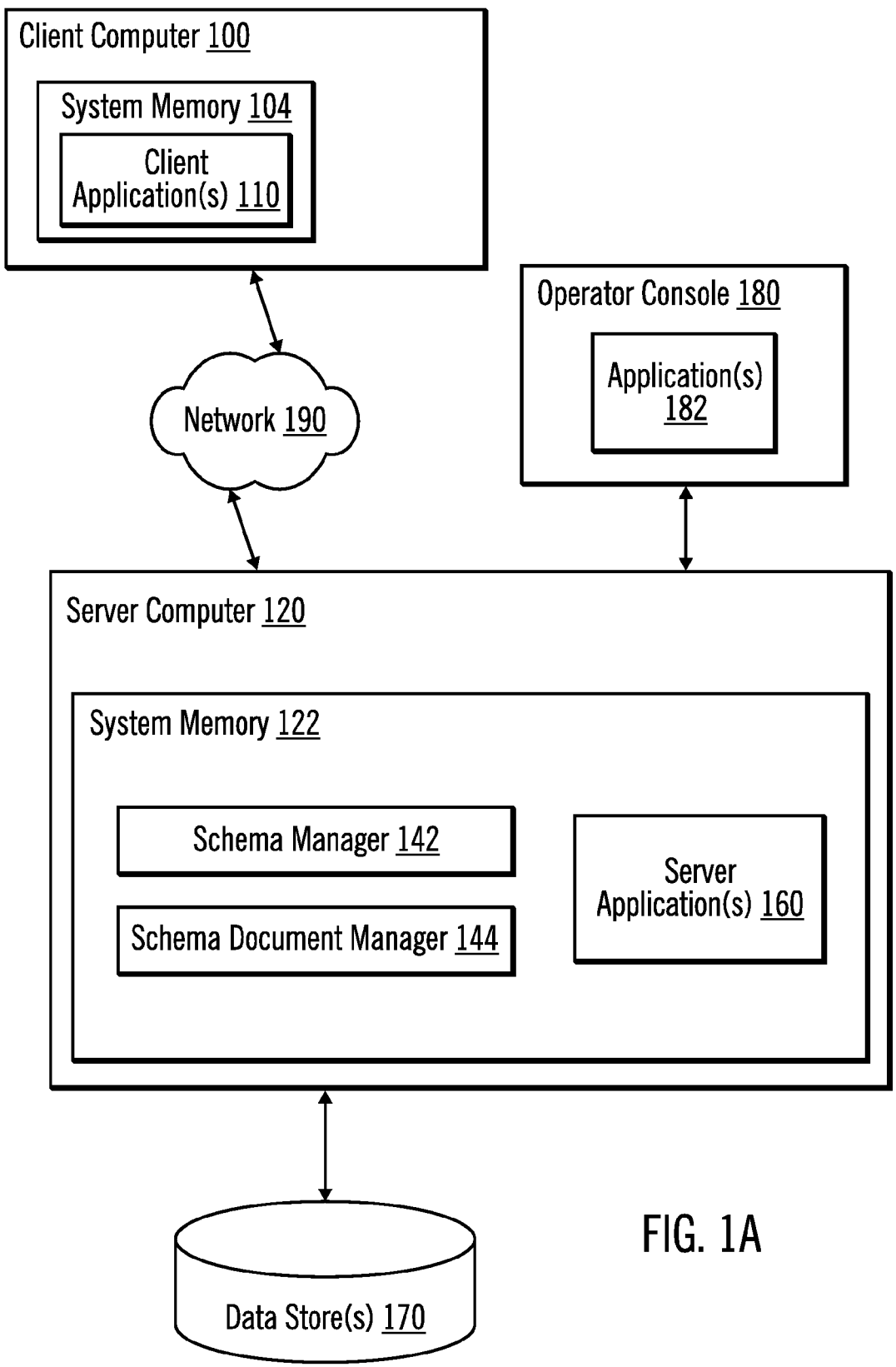
FIG. 1A illustrates, in a block diagram, a computing environment in accordance with certain implementations of the invention.

FIG. 1A illustrates, in a block diagram, a computing environment in accordance with certain implementations of the invention. A client computer 100 is connected via a network 190 to a server computer 120. The client computer 100 may comprise any computing device known in the art, such as a server, mainframe, workstation, personal computer, hand held computer, laptop telephony device, network appliance, etc. The network 190 may comprise any type of network, such as, for example, a Storage Area Network (SAN), a Local Area Network (LAN), Wide Area Network (WAN), the Internet, an Intranet, etc. The client computer 100 includes system memory 104, which may be implemented in volatile and/or non-volatile devices. One or more client applications 110 may execute in the system memory 104.

The server computer 120 includes system memory 122, which may be implemented in volatile and/or non-volatile devices. A schema manager 142 and a schema document manager 144 execute in the system memory 122. In certain implementations, the schema manger 142 performs management tasks related to schemas, such as, for example, registering schemas, deregistering schemas, and versioning of schemas. In certain implementations, the schema document manager 144 performs management tasks related to schema documents, such as, for example, versioning. Although components 142 and 144 are illustrated as separate components, the functionality of the components 142 and 144 may be implemented in fewer or more or different components than illustrated. Additionally, the functionality of the components 142 and 144 may be implemented at, for example, a Web application server computer or other server computer that is connected to the server computer 120. Additionally, one or more server applications 160 execute in system memory 122.

The server computer 120 provides the client computer 100 with access to data in one or more data stores 170 (e.g., databases). Although data stores 170 are illustrated for ease of understanding, data in data stores 170 may be stored in data stores at other computers connected to server computer 120.

Also, an operator console 180 executes one or more applications 182 and is used to access the server computer 120 and the data store 170.

The data store 170 may comprise an array of storage devices, such as Direct Access Storage Devices (DASDs), Just a Bunch of Disks (JBOD), Redundant Array of Independent Disks (RAID), virtualization device, etc.

Figure 1B:
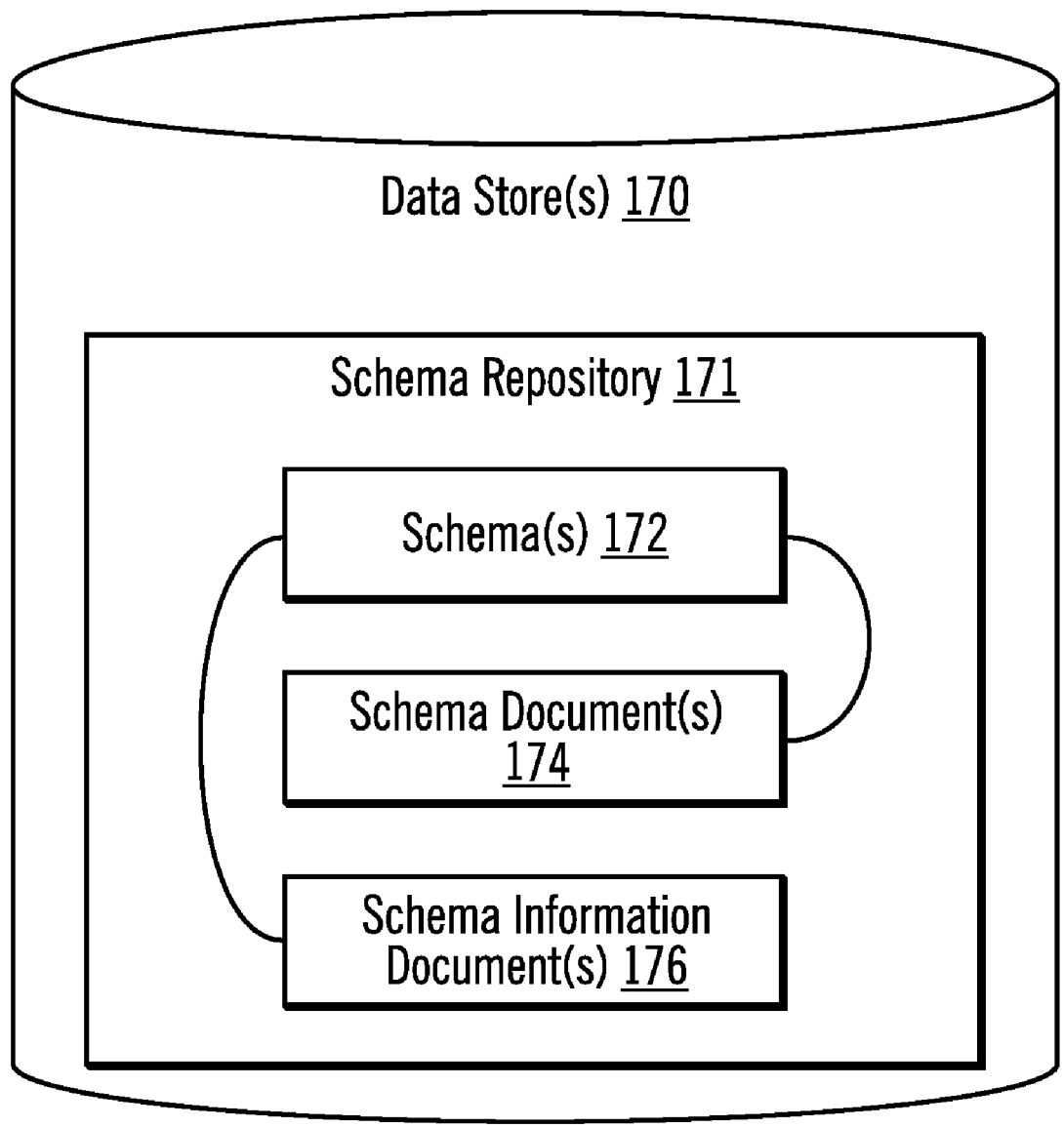
FIG. 1B illustrates, in a block diagram, further details of a data store in accordance with alternative implementations of the invention.

FIG. 1B illustrates, in a block diagram, further details of a data store 170 in accordance with certain implementations of the invention. Data store 170 includes a schema repository 171 for storing one or more schemas 172, one or more schema documents 174, and one or more schema information documents 176. Although a single schema repository 171 is illustrated for storing schemas 172, schema documents 174, and schema information documents 176, there may be multiple schema repositories (e.g., three repositories, one for schemas, one for schema documents, and one for schema information documents). Also, a schema document is associated with the one or more schema documents, and the schema is also associated with a schema information document.

Figure 2:
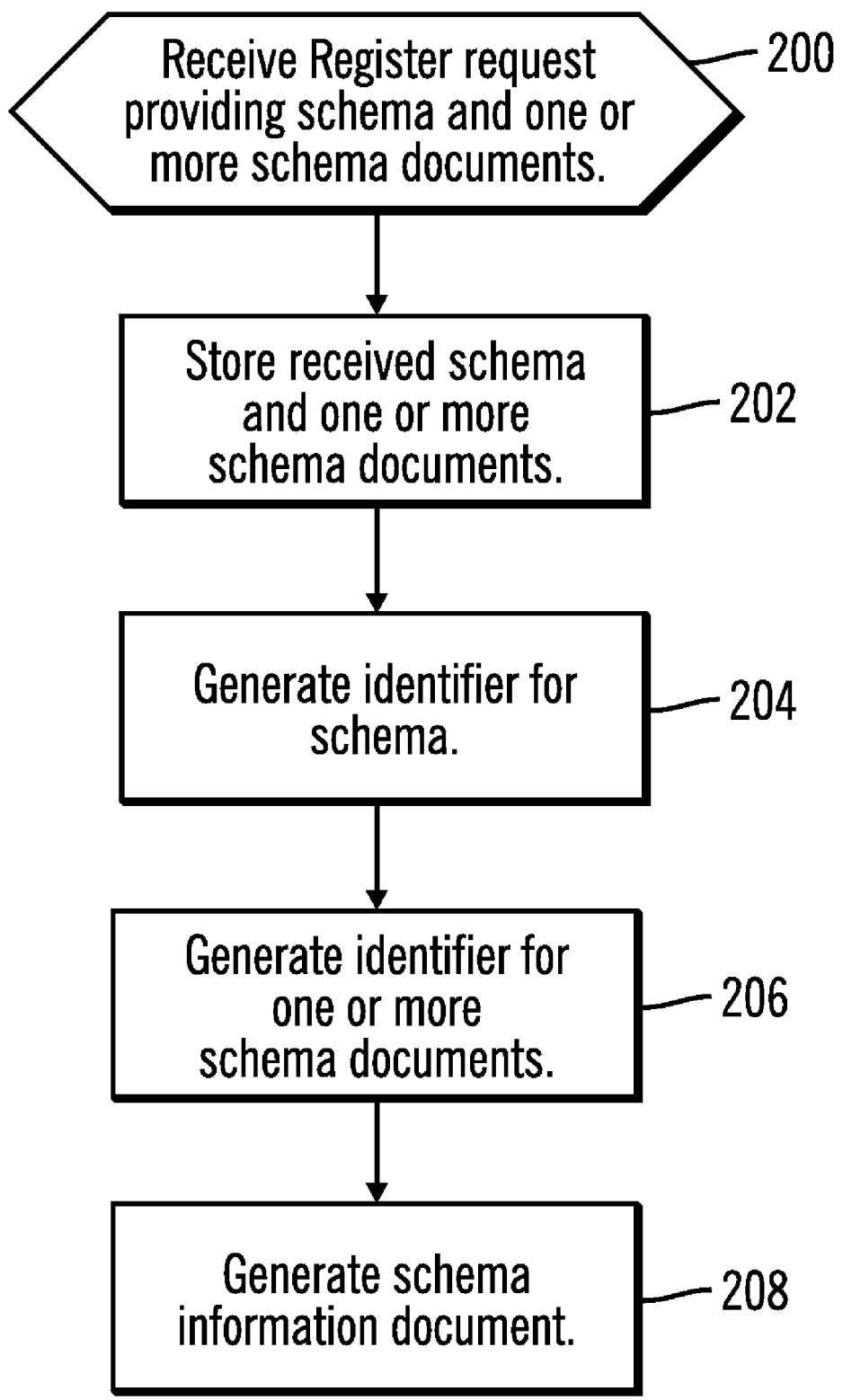
FIG. 2 illustrates logic for registration and identification of schemas and associated schema documents in accordance with certain implementations of the invention.

FIG. 2 illustrates logic for registration and identification of schemas and associated schema documents in accordance with certain implementations of the invention. In certain implementations of the invention, the schemas and schema documents are XML schemas and XML schema documents. Control begins at block 200 with the schema manager 142 receiving a register request. The register request may be, for example, a register command or Application Programming Interface (API), provided by implementations of the invention. The register request provides a schema and one or more schema documents. In certain implementations, registering a schema may be described with the processing performed in blocks 202-208. In block 202, the schema manager 142 stores the schema and the one or more schema documents in the schema repository 171.

Figure 3:
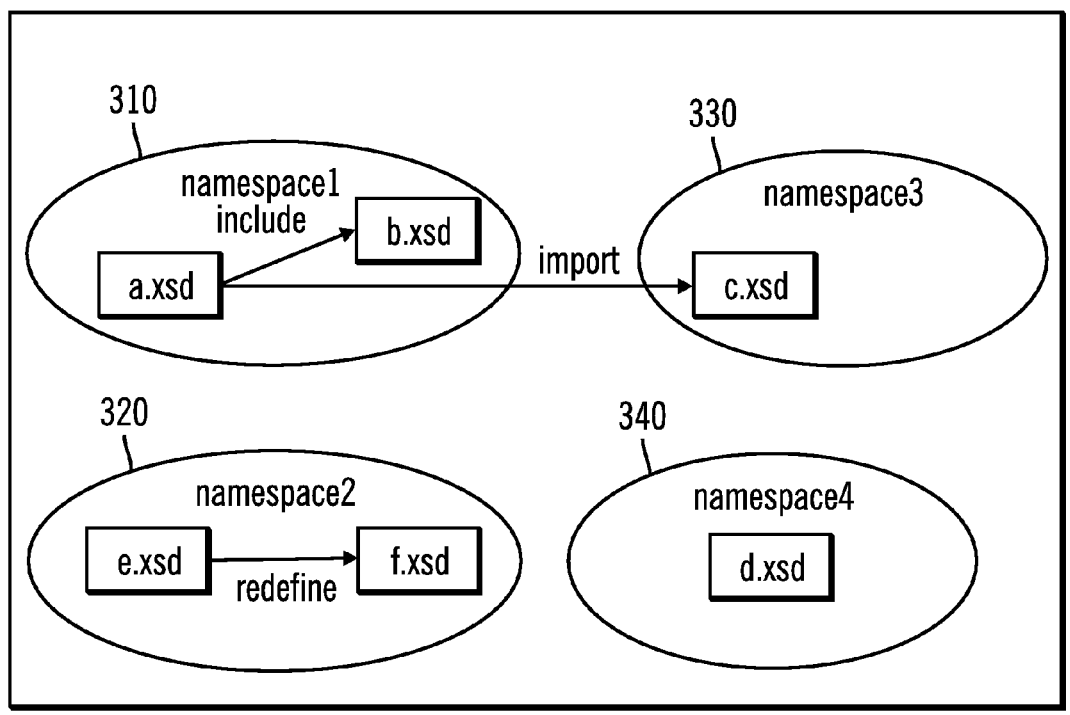
FIG. 3 illustrates a conceptual schema in accordance with certain implementations of the invention.

A schema document may be a simple schema document or a compound schema document. A simple schema document may be described as a single schema document. A compound schema document may be described as a primary schema document that includes, redefines, and/or imports other schema documents recursively. FIG. 3 illustrates a conceptual schema in accordance with certain implementations of the invention. The term "conceptual" is used to highlight that a schema is a logical entity that is comprised of schema documents that are physical entities. The conceptual schema is represented by a set of XML schema documents encompassing three namespaces, namespace1 310, namespace2 320, and namespace3 330. A compound schema document is represented by primary schema document a.xsd, which includes schema document b.xsd in namespace1 310 and imports schema document c.xsd from namespace3 330. Another compound schema document is represented by primary schema document e.xsd, which redefines schema document f.xsd in namespace2 320. A simple schema document is d.xsd in namespace4 340. The "xsd" suffix of each schema stands for "XML schema document." The conceptual XML schema may be used (e.g., for validating XML documents) after registration of the three separate XML schemas: (a.xsd with b.xsd and c.xsd), (d.xsd), and (e.xsd with f.xsd). Although the examples herein may refer to XML schemas and XML schema documents, implementations of the invention are applicable to other schemas and documents.

In FIG. 2, at block 204, the schema manager 142 generates an identifier for the schema. In certain implementations, to support common usage scenarios and versioning, a schema is associated with and uniquely identified by a three-part composite key: (target namespace, schema location, version). The target namespace and schema location of a schema document in a compound schema may be taken from those of a primary schema document. In certain implementations, either the target namespace or schema location may be null, but not both. Optionally, a version identifier may be included. The version identifier may be provided by user or generated by the schema manager 142. The version identifier may be null. Also, a schema may also be associated with and identified by a unique name in addition to the three-part composite key.

Figure 4A:
FIG. 4A illustrates a table of schemas in accordance with certain implementations of the invention.

FIG. 4A illustrates a table 400 of schemas in accordance with certain implementations of the invention. Each row in the table 400 includes a schema identifier, a target namespace, a schema location, a version, and a binary representation of the schema (e.g., an XML grammar). Ellipses are used in the figure to represent the binary representations. In certain implementations, the target namespaces and schema locations are URIs. For example, schema s1 is in target namespace namespace1, is in schema location sl1, has a null version identifier, and has a binary representation.

In block 206, the schema document manager 144 generates an identifier for the one or more schema documents. A schema document is also associated with and uniquely identified by a three-part composite key: (target namespace, schema location, version). The target namespace may be one that is specified in the schema document. The schema location may be provided by a user or may be null. The version identifier is optional and may be provided by a user or generated by the schema manager. The version identifier may be null.

Figure 4B:
FIG. 4B illustrates a table of schema documents in accordance with certain implementations of the invention.

FIG. 4B illustrates a table 410 of schema documents in accordance with certain implementations of the invention. Each row in the table 410 includes a schema document identifier, document content, a target namespace, a schema location, and a version. Ellipses are used in the figure to represent the document content. In certain implementations, the target namespaces and schema locations are URIs. For example, schema document sd1 has document content, is in target namespace namespace1, has a null schema location, and has version identifier v1.

The schema manger 142 supports versioning of schemas and schema documents. For a schema document, which is associated with and uniquely identified by a three-part composite key (target namespace, schema location, version), the schema manager 142 supports namespace versioning, schema location versioning, and/or a version attribute. Namespace versioning refers to embedding a version identifier in the namespace URI. Schema location versioning refers to embedding a version identifier in the schema location URI. The version attribute refers to embedding a version identifier as the value of the version attribute of the schema element.

For a schema that is associated with and uniquely identified by a three-part composite key (target namespace, schema location, version), the target namespace and schema location may be identical to those of its primary schema document. The version identifier, however, is independent of that of the primary schema document. This allows versioning of schemas to be in sync with versioning of schema documents where applicable, but independent of versioning of schema documents when needed. For example, for schema version 5, primary schema document a.xsd may be version1 and schema document b.xsd may be version2, while for schema version6, primary schema document a.xsd may be version1 and schema document b.xsd may be version3.

Figure 5:
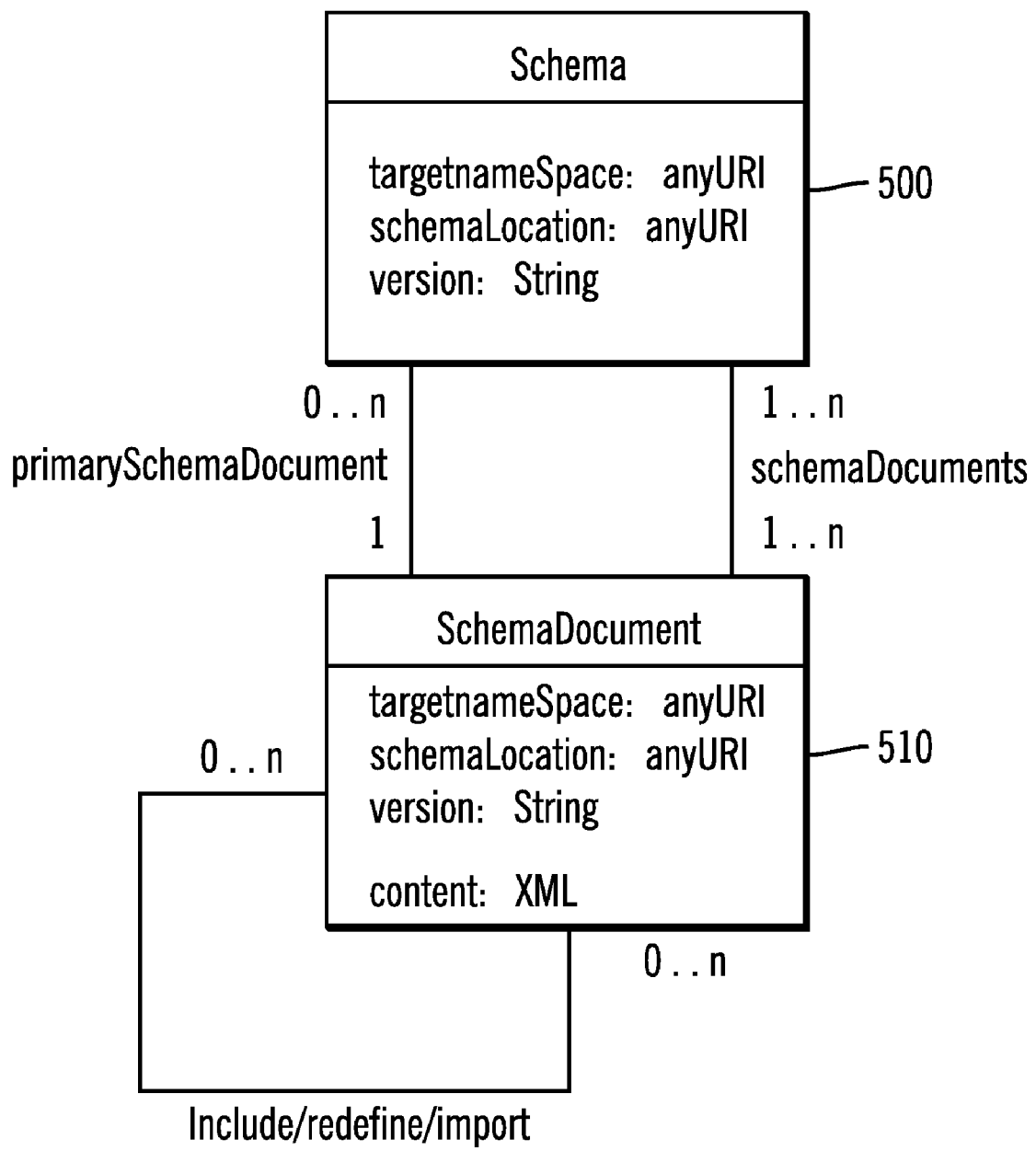
FIG. 5 illustrates an information model of schemas and their associated schema documents in accordance with certain implementations of the invention.

FIG. 5 illustrates an information model of schemas and their associated schema documents in accordance with certain implementations of the invention. In FIG. 5, the information model is represented using Uniform Modeling Language (UML). A schema 500 has a primary schema document 510, which may include, redefine, and/or import other schema documents 510, recursively. Therefore, a schema 500 is associated with one or more schema documents 510. A schema document 510 may be a primary schema document of more than one schema 500. That is, a schema document 510 may be associated with one or more schemas 500.

In certain implementations, the schema repository 171 consists of a schemas collection and a schema documents collection. The schemas collection is used to store metadata about schemas. Such metadata includes the identification of a primary schema document and the associations (e.g., include, redefine, and/or import) between the primary schema document and other schema documents, recursively. Then, the schemas collection is indexed by target namespace, schema location, version, and/or name. The schema documents collection is used to store schema documents and is indexed by target namespace, schema location, and/or version.

In block 208, the schema manager 142 automatically generates a schema information document for the schema and one or more schema documents. The schema information document formalizes and records the meta-information of a schema. The meta-information of a schema includes, for example, identification of a primary schema document, identification of other associated schema documents, and how the primary and other schema documents are related to each other (e.g., through include, redefine, and or import associations, etc.). The meta-information of the schema is recorded at registration time for later use in the schema information document. In certain implementations, the schema information document may be an XML document. The following sample schema defines a schema information document for a compound schema in accordance with certain implementations of the invention:

```
<?xml version="1.0" encoding="UTF-8"?>
<xs:schema targetNamespace="http://www.xs.org/XMLSchema"
    xmlns:xs="http://www.w3.org/2001/XMLSchema"
    xmlns="http://www.xs.org/XMLSchema">
    <xs:element name="schemaInfo">
        <xs:complexType>
            <xs:sequence>
                <xs:element name="targetNamespace"
                    type="xs:anyURI"
                        nillable="true" minOccurs="0"/>
                <xs:element name="schemaLocation"
                    type="xs:anyURI"
                        nillable="true" minOccurs="0"/>
                <xs:element name="version" type="xs:string"
                        nillable="true" minOccurs="0"/>
                <xs:element name="name" type="xs:string"
                    nillable="true"
                        minOccurs="0"/>
                <xs:element ref="schemaDocInfo"
                    maxOccurs="unbounded"/>
            </xs:sequence>
        </xs:complexType>
    </xs:element>
    <xs:elementname="schemaDocInfo">
        <xs:complexType>
            <xs:sequence>
                <xs:element name="targetNamespace"
                    type="xs:anyURI"
                        nillable="true" minOccurs="0"/>
                <xs:element name="schemaLocation"
                    type="xs:anyURI"
                        nillable="true" minOccurs="0"/>
                <xs:element name="version" type="xs:string"
                        nillable="true" minOccurs="0"/>
                <xs:element name="source" type="xs:anyURI"
                        minOccurs="0"/>
                <xs:element name="url" type="xs:anyURI"
                        minOccurs="0"/>
                <xs:element name="include" minOccurs="0">
                    <xs:complexType>
                        <xs:attribute name="idref"
                            type="xs:IDREF"/>
                    </xs:complexType>
                </xs:element>
                <xs:element name="redefine" minOccurs="0">
                    <xs:complexType>
                        <xs:attribute name="idref"
                            type="xs:IDREF"/>
                    </xs:complexType>
                </xs:element>
                <xs:element name="import" minOccurs="0">
                    <xs:complexType>
                        <xs:attribute name="idref"
                            type="xs:IDREF"/>
                    </xs:complexType>
                </xs:element>
            </xs:sequence>
            <xs:attribute name="id" type="xs:ID"/>
            <xs:attribute name="primary" type="xs:boolean"/>
        </xs:complexType>
    </xs:element>
</xs:schema>
```

The element name="schemaInfo" indicates the start of information for a schema, and the attribute xs:complexType indicates that this is a compound schema. Then, the targetNamespace, schemaLocation, version, and type provide the three-part composite key and an optional unique name for the schema. The use of nillable="true" represents a NULL value.

Then, element ref="schemaDocInfo" indicates the start of information for a schema document. Then, the targetNameSpace, schemaLocation, and version information provide the three-part composite key for the schema document. Also, the schema document may specify a source that indicates a physical location at which the schema document exists, for example, as a file. The schema document may also include, import, or redefine another schema document. If the schema document is a primary document, then the primary attribute is set to true.

The following is sample content of a schema information document that records meta information of XML schema, (a.xsd with b.xsd and c.xsd) from FIG. 3, in accordance with certain implementations of the invention:

schema. Each schema for which the user has the replace privilege is affected. To affect all schemas that share the schema document, the schema manger 142 ensures that the user has the replace privilege on all schemas that share the schema document. When a schema document is replaced, then new binary representations are generated for the schemas that share that schema document.

```
<?xml version="1.0" encoding="UTF-8"?>
<si:schemaInfo xmlns:si="http://www.xs.org/XMLSchema"
    xmlns:xsi="http://www.w3.org/2001/XMLSchema-instance"
    xsi:schemaLocation="http://www.xs.org/XMLSchema SchemaInfo.xsd">
    <targetNamespace>http://www.foo.com/NS1</targetNamespace>
    <schemaLocation>http://www.foo.com/schemas/a.xsd</schemaLocation>
    <version xsi:nil="true"/>
    <name>Example</name>
    <si:schemaDocInfo id="sd1" primary="true">
        <targetNamespace>http://www.foo.com/NS1</targetNamespace>
        <schemaLocation>http://www.foo.com/schemas/a.xsd</schemaLocation>
        <version xsi:nil="true"/>
        <source>a.xsd</source>
        <url>http://www.foo.com/SCHEMA_DOCS/PUBLIC/a.xsd</url>
        <include idref="sd2"/>
        <import idref="sd3"/>
    </si:schemaDocInfo>
    <si:schemaDocInfo id="sd2">
        <targetNamespace>http://www.foo.com/NS1</targetNamespace>
        <schemaLocation>http://www.foo.com/schemas/b.xsd</schemaLocation>
        <version xsi:nil="true"/>
        <source>b.xsd</source>
        <url>http://www.foo.com/SCHEMA_DOCS/PUBLIC/b.xsd</url>
    </si:schemaDocInfo>
    <si:schemaDocInfo id="sd3">
        <targetNamespace>http://www.foo.com/NS3</targetNamespace>
        <schemaLocation>http://www.foo.com/schemas/c.xsd</schemaLocation>
        <version xsi:nil="true"/>
        <source>c.xsd</source>
        <url>http://www.foo.com/SCHEMA_DOCS/PUBLIC/c.xsd</url>
    </si:schemaDocInfo>
</si:schemaInfo>
```

Figure 6:
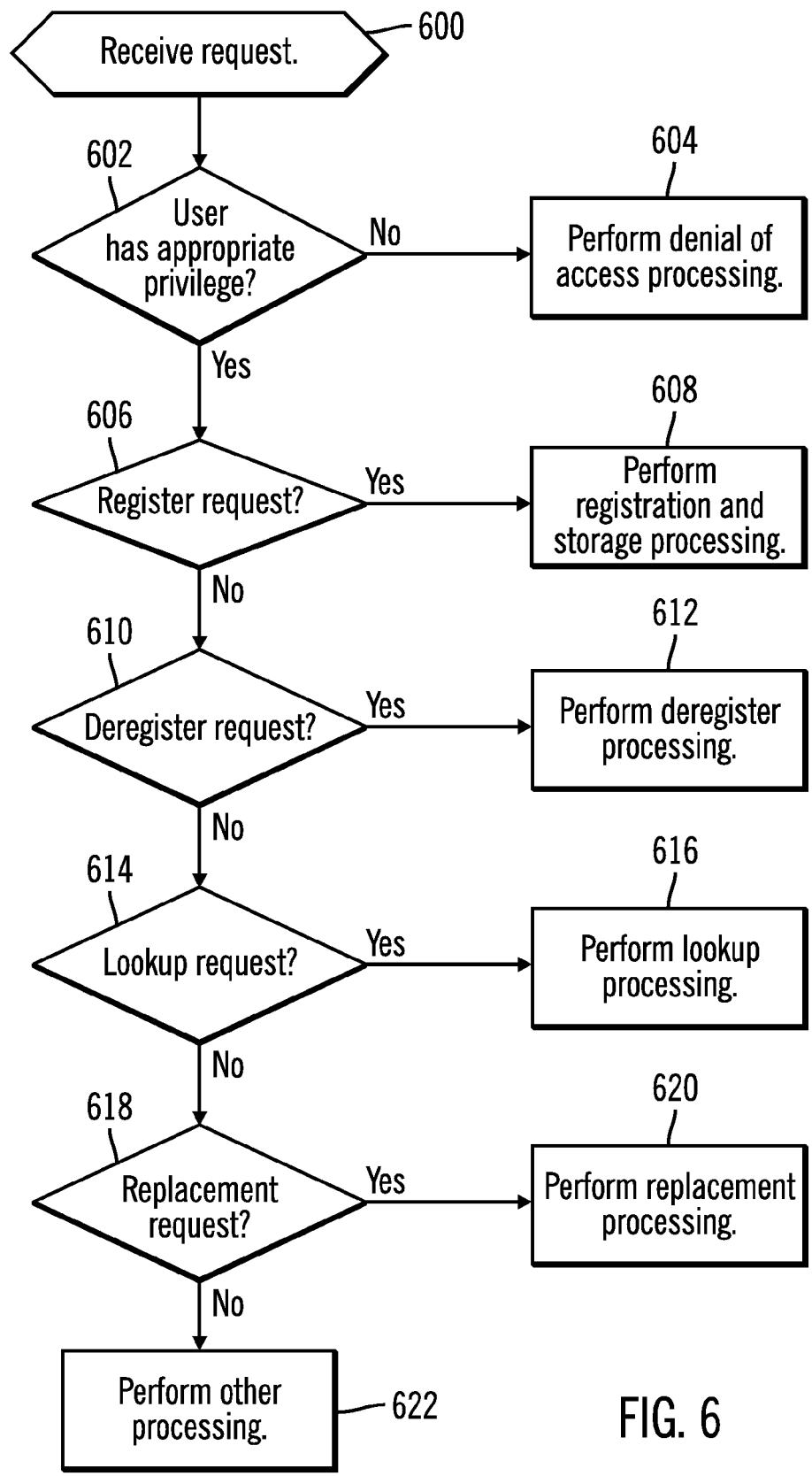
FIG. 6 illustrates logic for processing requests in accordance with certain implementations of the invention.

FIG. 6 illustrates logic for processing requests in accordance with certain implementations of the invention. Implementations of the invention enable management functions to be performed on the schema and the one or more associated schema documents using the schema information document. For example, if a schema is specified in a management function, the schema information document that is associated with the schema may be used to identify one or more associated schema documents.

Control begins at block 600 with the schema manager 142 receiving a request. The register request may be, for example, a command or Application Programming Interface (API), provided by implementations of the invention. In block 602, the schema manager 142 determines whether the user submitting the request has the appropriate privilege to perform the request. That is, in block 602, the schema manager 142 performs access processing. The schema manager 142 supports access control of schemas and associated schema documents. The following privileges for accessing schemas are supported: register, read, replace, and deregister. In certain implementations, the access privileges are associated with users of particular schemas. Then, the access privileges associated with a schema for a user are also associated with schema documents that are associated with the schema. In certain alternative implementations, separate privileges for accessing schema documents are supported.

For example, if a user wishes to replace a schema document that is shared by more than one schemas, the schema manager 142 ensures that the user has a replace privilege on at least one If the user has access control, processing continues to block 606, otherwise, processing continues to block 604. In block 604, denial of access processing is performed by the schema manager 142. In certain implementations, a message may be sent to the user indicating that the user does not have the appropriate privilege to perform the request.

In block 606, if the request is a register request, processing continue to block 608, otherwise, processing continues to block 610.

In block 608, the schema manager 142 performs registration and storage processing. The registration and storage processing includes generating identifiers for the schema and one or more schema documents and generating a schema information document for the schema and the one or more schema documents, as were discussed with reference to FIG. 2.

Additionally, more than one schema may share the same schema document. A schema may be related to one or more associated schema documents through references. When a schema is registered in the schema repository, the associated schema documents are stored in the schema repository using the following technique. First, the schema manager 142 determines whether a copy of the newly received schema document already exists in the schema repository. The determination of whether a copy of the newly received schema document exists may be made by determining whether the newly received schema document is identical to an existing schema document. In certain implementations, two schema documents are identical to each other if they have the same target namespace, the same schema location, and the same content (e.g., using binary comparison). If a schema document already exists in the schema repository, the newly received schema document is not stored again as only one copy of a given schema document is stored in the schema repository. However, in certain implementations, different versions of a schema document are not considered to be identical.

If there is a (target namespace, schema location) collision (i.e., there already exists a schema documents with the same target namespace and schema location but different content as the newly received schema document), the schema manager 142 stores the newly received schema document with a version identifier. The version identifier may be generated by the schema manager 142 or provided by a user.

In block 610, if the request is a deregister request, processing continues to block 612, otherwise, processing continues to block 614. In block 612, the schema manager 142 performs deregister processing. In certain implementations, deregistering a schema refers to deleting the schema.

Once registered, a schema may be deregistered according to deregister rules associated with the schema when the schema is provided for registration. The associated schema documents, which are not referenced by other schemas, are removed from the schema repository when the schema is removed. The deregister rules are, in the order of decreasing precedence: restrict, cascade, set NULL, and no action. For the restrict deregister rule, if there are schema documents that were validated using the schema, the schema is not deregistered. For the cascade deregister rule, the schema is deregistered and schema documents that were validated using the schema are deleted. For the set NULL deregister rule, the schema is deregistered and schema documents that were validated using the schema are set to the status of "not validated". The no action deregister rule is similar to the restrict deregister rule, but the no action deregister rule is enforced after the other higher-priority deregister rules have been enforced.

In block 614, if the request is a lookup request, processing continues to block 616, otherwise, processing continues to block 618. in block 616, the schema manager 142 performs lookup processing. The schema manager 142 is able to lookup a schema and associated schema documents. To lookup a schema, the lookup request provides a three-part composite key (target namespace, schema location, version) or unique name. In the three-part composite key, either target namespace or schema location is used for the lookup, and the other may be NULL. Also, the version is optional.

In certain implementations, the following look-up technique is used. If there is one matching schema, the schema manager 142 returns this schema. If there are multiple matching schemas, the schema manager 142 applies a user-defined technique and/or a system-defined (e.g., default) technique to filter the results. If at the end of the filtering process, there are still multiple schemas, the schema manager 142 raises an error. If there is no matching schema, the schema manager 142 optionally applies a user-defined technique and/or a system-defined technique to find a matching schema. For example, the lookup request may reference namespace3, which results in no match, but the user-defined technique may specify that namespace1 is equivalent to namespace3, and then a lookup is performed of namespace3. If, after applying the user-defined technique, there is still no matching schema, the schema manager 142 returns NULL.

Once a schema has been found, associated schema documents are located using the information contained in its schema information document.

In block 618, if the request is a replacement request, processing continues to block 620, otherwise, processing continues to block 622. In block 620, the schema manager 142 performs replacement processing. That is, the schema manager 142 supports replacement of schemas and schema documents. In certain implementations, a schema may be replaced after registration if the new schema is backward compatible (i.e., all schema documents that were validated against the existing schema remain valid against the new schema). Similarly, in certain implementations, a schema document, which is associated with one or more schemas, may be replaced after registration if the new schema document is backward compatible (i.e., the new schema document is backward compatible with schemas that reference the new schema document).

In block 622, other processing may be performed.

Thus, implementations of the invention provide registration and management of schemas and associated schema documents; identification of schemas and schema documents; formalization of meta information of schemas in schema information documents; lookup of schemas and associated schema documents; versioning of schemas and schema documents; sharing of schema documents among schemas; replacement of schemas and schema documents; and, access control of schemas and associated schema documents.

IBM is a registered trademark or common law mark of International Business Machines Corporation in the United States and/or other countries.

Additional Implementation Details

The described techniques for schema management may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which various implementations are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 2 and 6 describes specific operations occurring in a particular order. In alternative implementations, certain of the logic operations may be performed in a different order, modified or removed. Moreover, operations may be added to the above described logic and still conform to the described implementations. Further, operations described herein may occur sequentially or certain operations may be processed in parallel, or operations described as performed by a single process may be performed by distributed processes.

The illustrated logic of FIGS. 2 and 6 may be implemented in software, hardware, programmable and non-programmable gate array logic or in some combination of hardware, software, or gate array logic.

Figure 7:
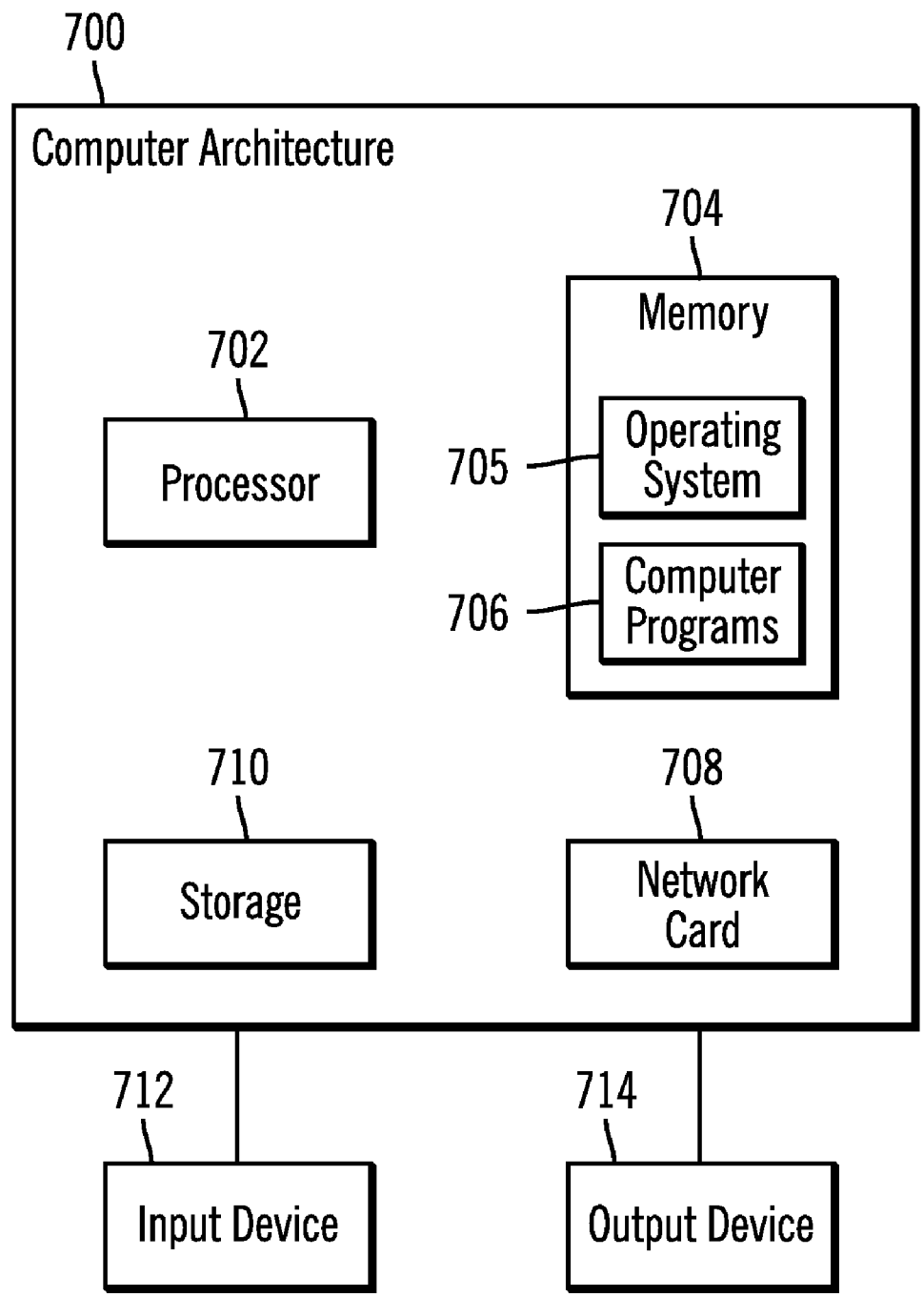
FIG. 7 illustrates an architecture of a computer system that may be used in accordance with certain implementations of the invention.

FIG. 7 illustrates an architecture 700 of a computer system that may be used in accordance with certain implementations of the invention. Client computer 100, server computer 120, and/or operator console 180 may implement computer architecture 700. The computer architecture 700 may implement a processor 702 (e.g., a microprocessor), a memory 704 (e.g., a volatile memory device), and storage 710 (e.g., a non-volatile storage area, such as magnetic disk drives, optical disk drives, a tape drive, etc.). An operating system 705 may execute in memory 704. The storage 710 may comprise an internal storage device or an attached or network accessible storage. Computer programs 706 in storage 710 may be loaded into the memory 704 and executed by the processor 702 in a manner known in the art. The architecture further includes a network card 708 to enable communication with a network. An input device 712 is used to provide user input to the processor 702, and may include a keyboard, mouse, pen-stylus, microphone, touch sensitive display screen, or any other activation or input mechanism known in the art. An output device 714 is capable of rendering information from the processor 702, or other component, such as a display monitor, printer, storage, etc. The computer architecture 700 of the computer systems may include fewer components than illustrated, additional components not illustrated herein, or some combination of the components illustrated and additional components.

The computer architecture 700 may comprise any computing device known in the art, such as a mainframe, server, personal computer, workstation, laptop, handheld computer, telephony device, network appliance, virtualization device, storage controller, etc. Any processor 702 and operating system 705 known in the art may be used.

The foregoing description of implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. An article of manufacture embodied as one of a computer readable storage device and hardware logic including program logic for managing schemas, wherein the program logic causes operations to be performed, the operations comprising:
   registering a schema and one or more associated schema documents;
   automatically generating a schema information document based on the schema and the one or more associated schema documents, wherein the schema information document formalizes and records meta-information of the schema, wherein the meta-information of the schema includes identification of a primary schema document, identification of other associated schema documents, and how the primary and the other schema documents are related to each other, wherein the schema and the one or more schema documents are stored by:
   when a copy of the schema document has already been stored, discarding the schema document, wherein it is determined that the copy of the schema document has already been stored by determining that the schema document to be stored and a schema document that has already been stored have a same target namespace, a same schema location, and same content; and
   when the schema document to be stored and a schema document that has already been stored have a same target namespace, a same schema location, and different content, storing the schema document with a version identifier; and
   processing a request to be performed on at least one of the schema and an associated schema document using the schema information document.

2. The article of manufacture of claim 1, wherein the operations further comprise:
   storing an identifier for the schema, wherein the identifier includes a three-part composite key and a unique name, wherein the three-part composite key includes a target namespace and a schema location; and
   storing identifiers for each of the one or more associated schema documents, wherein each identifier includes a three-part composite key.

3. The article of manufacture of claim 1, wherein the request comprises deregistering the schema according to deregister rules associated with the schema when the schema is registered.

4. The article of manufacture of claim 1, wherein the request comprises lookup of a schema and wherein the operations further comprise:
   when there is one matching schema, returning the matching schema;
   when there are multiple matching schemas, applying a filter to identify one matching schema;
   when there is no matching schema, applying at least one of a user-defined technique and a system defined technique to find a matching schema; and
   wherein information in the schema information document is used to locate associated schema documents when the schema has been identified.

5. The article of manufacture of claim 1, wherein the request comprises replacement of at least one of the schema and one of the schema documents and wherein the operations further comprise:
   replacing the schema if a new schema is backward compatible; and
   replacing one of the schema documents if a new schema document is backward compatible.

6. The article of manufacture of claim 1, wherein the request comprises access of at least one of the schema and one of the schema documents and wherein access is granted based on an access privilege associated with a user and the schema.

7. An article of manufacture embodied as one of a computer readable storage device and hardware logic including program logic for managing schemas, wherein the program logic causes operations to be performed, the operations comprising:
   registering a schema and one or more associated schema documents;
   storing an identifier for the schema, wherein the identifier includes a three-part composite key and a unique name, wherein the three-part composite key includes a target namespace and a schema location, wherein at least one part of the three-part composite key includes a version identifier that is independent of a primary schema document, wherein versioning of the schema is capable of being independent of versioning of the associated schema documents;

storing identifiers for each of the one or more associated schema documents, wherein each identifier includes an associated three-part composite key;

automatically generating a schema information document based on the schema and the one or more associated schema documents, wherein the schema information document formalizes and records meta-information of the schema, wherein the meta-information of the schema includes identification of a primary schema document, identification of other associated schema documents, and how the primary and the other schema documents are related to each other; and processing a request to be performed on at least one of the schema and an associated schema document using the schema information document.

8. A system for managing schemas, comprising:

means for registering a schema and one or more associated schema documents;

means for automatically generating a schema information document based on the schema and the one or more associated schema documents, wherein the schema information document formalizes and records meta-information of the schema, wherein the meta-information of the schema includes identification of a primary schema document, identification of other associated schema documents, and how the primary and the other schema documents are related to each other, wherein the schema and the one or more schema documents are stored by:

when a copy of the schema document has already been stored, discarding the schema document, wherein it is determined that the copy of the schema document has already been stored by determining that the schema document to be stored and a schema document that has already been stored have a same target namespace, a same schema location, and same content; and when the schema document to be stored and a schema document that has already been stored have a same target namespace, a same schema location, and different content, storing the schema document with a version identifier; and means for processing a request to be performed on at least one of the schema and an associated schema document using the schema information document.

9. The system of claim 8, further comprising:

means for storing an identifier for the schema, wherein the identifier includes a three-part composite key and a unique name, wherein the three-part composite key includes a target namespace and a schema location; and means for storing identifiers for each of the one or more associated schema documents, wherein each identifier includes a three-part composite key.

10. The system of claim 8, wherein the request comprises deregistering the schema according to deregister rules associated with the schema when the schema is registered.

11. The system of claim 8, wherein the request comprises lookup of a schema and further comprising:

means for, when there is one matching schema, returning the matching schema;

means for, when there are multiple matching schemas, applying a filter to identify one matching schema;

means for, when there is no matching schema, applying at least one of a user-defined technique and a system defined technique to find a matching schema; and means for, wherein information in the schema information document is used to locate associated schema documents when the schema has been identified.

12. The system of claim 8, wherein the request comprises replacement of at least one of the schema and one of the schema documents and further comprising:

means for replacing the schema if a new schema is backward compatible; and means for replacing one of the schema documents if a new schema document is backward compatible.

13. The system of claim 8, wherein the request comprises access of at least one of the schema and one of the schema documents and wherein access is granted based on an access privilege associated with a user and the schema.

14. A system for managing schemas, comprising:

means for registering a schema and one or more associated schema documents;

means for storing an identifier for the schema, wherein the identifier includes a three-part composite key and a unique name, wherein the three-part composite key includes a target namespace and a schema location, wherein at least one part of the three-part composite key includes a version identifier that is independent of a primary schema document, wherein versioning of the schema is capable of being independent of versioning of the associated schema documents;

means for storing identifiers for each of the one or more associated schema documents, wherein each identifier includes an associated three-part composite key;

means for automatically generating a schema information document based on the schema and the one or more associated schema documents, wherein the schema information document formalizes and records meta-information of the schema, wherein the meta-information of the schema includes identification of a primary schema document, identification of other associated schema documents, and how the primary and the other schema documents are related to each other; and means for processing a request to be performed on at least one of the schema and an associated schema document using the schema information document.

* * * * *